United States Patent
Bloomfield

(10) Patent No.: US 10,570,014 B2
(45) Date of Patent: Feb. 25, 2020

(54) PROCESS FOR MANUFACTURING A PURIFIED AQUEOUS HYDROGEN PEROXIDE SOLUTION

(71) Applicant: SOLVAY SA, Brussels (BE)

(72) Inventor: Stephen Bloomfield, Tervuren (BE)

(73) Assignee: Solvay SA, Brussels (BE)

( * ) Notice: Subject to any disclaimer, the term of this patent is extended or adjusted under 35 U.S.C. 154(b) by 473 days.

(21) Appl. No.: 14/653,202

(22) PCT Filed: Dec. 19, 2013

(86) PCT No.: PCT/EP2013/077444
§ 371 (c)(1),
(2) Date: Jun. 17, 2015

(87) PCT Pub. No.: WO2014/096223
PCT Pub. Date: Jun. 26, 2014

(65) Prior Publication Data
US 2016/0185598 A1   Jun. 30, 2016

(30) Foreign Application Priority Data
Dec. 20, 2012 (EP) ..................... 12198510

(51) Int. Cl.
*C01B 15/013* (2006.01)
*C01B 15/023* (2006.01)
*B01D 11/04* (2006.01)
*B01J 19/24* (2006.01)

(52) U.S. Cl.
CPC ........ *C01B 15/013* (2013.01); *B01D 11/0488* (2013.01); *B01D 11/0492* (2013.01); *B01J 19/245* (2013.01); *C01B 15/023* (2013.01); *B01J 2219/24* (2013.01)

(58) Field of Classification Search
None
See application file for complete search history.

(56) References Cited

U.S. PATENT DOCUMENTS 4,390,418 A * 6/1983 Sherman ................ C10G 21/28
208/321
5,302,367 A 4/1994 Signorini et al.
(Continued)

FOREIGN PATENT DOCUMENTS

EP    0033029 A1 * 8/1981 ......... B01D 53/1462
EP    0529723 A1    3/1993
(Continued)

OTHER PUBLICATIONS

Barton, Paul, et al—"Steam Distillation/Stripping", 1996, Handbook of Separation Techniques for Chemical Engineers, Section 1.4, McGraw Hill, Third Edition, pp. 249-273; 26 pgs.
(Continued)

*Primary Examiner* — Melissa S Swain
(74) *Attorney, Agent, or Firm* — Osha Liang LLP

(57) ABSTRACT

The present invention relates to an improved process for manufacturing a purified aqueous hydrogen peroxide solution. The invention further relates to a plant for producing hydrogen peroxide in which the improved process for manufacturing a purified aqueous hydrogen peroxide solution according to the present invention is employed.

15 Claims, 4 Drawing Sheets

(56) References Cited

Figure 1:
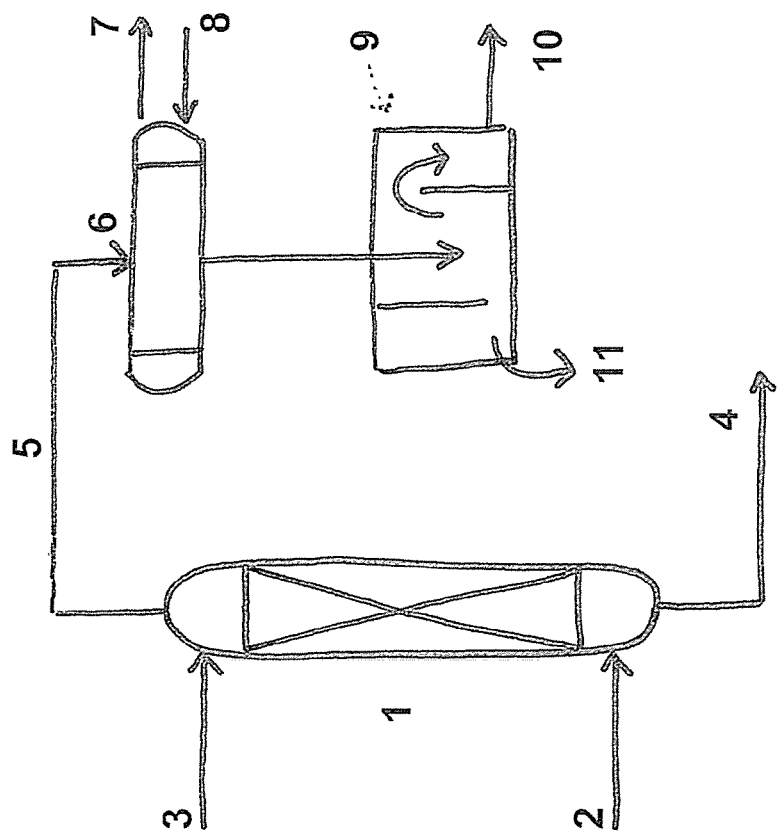

U.S. PATENT DOCUMENTS 6,224,845 B1     5/2001    Pennetreau et al.
2007/0131588 A1*   6/2007    Vermeiren ............. C10G 27/00
                                                                208/134

FOREIGN PATENT DOCUMENTS

GB             1123427 A  *   8/1968  ............... C08F 8/04
JP           2002161079 A  *   6/2002
JP           2002161079 A  *   6/2002
WO     WO 0069774 A1  *  11/2000  ......... B01D 53/1425

OTHER PUBLICATIONS

Kirk-Othmer, Encyclopedia of Chemical Technology, "Hydrogen Peroxide", Aug. 2001, vol. 13, John Wiley & Sons, Inc., pp. 1-58; 58 pgs.

Ullmann's Encyclopedia of Industrial Chemistry, 1989, "Hydrogen Peroxide", Fifth Edition, vol. A13, pp. 449-454; 6 pgs.

Moschou, P., et al—"Nitrogen stripping of isopropyl-alcohol and toluene in a falling film micro-reactor: Gas side mass transfer experiments and modelling at isothermal conditions", 2012, Chemical Engineering Science, vol. 76, Mar. 25, 2012, XP-002696268, pp. 216-223; 9 pgs.

Li, Changchun—"Reducing energy consumption and waste water emission through nitrogen gas stripping in solvent dewaxing unit", 1998, Runhuayou, vol. 13, Issue No. 5, pp. 13-15, Coden: Runihfc; Abstract Only (in English).

\* cited by examiner

PROCESS FOR MANUFACTURING A PURIFIED AQUEOUS HYDROGEN PEROXIDE SOLUTION

This application is a U.S. national stage entry under 35 U.S.C. § 371 of International Application No. PCT/EP2013/077444, filed Dec. 19, 2013, which claims priority to European patent application No. 12198510.5, filed on Dec. 20, 2012, the whole content of each of these applications is hereby incorporated herein by reference for all purposes.

The present invention relates to an improved process for manufacturing a purified aqueous hydrogen peroxide solution.

It is a known practice (patent application EP 0,529,723 in the name of Interox International) to obtain a purified aqueous hydrogen peroxide solution according to the alkylanthraquinone process. In this known process, a crude aqueous hydrogen peroxide solution is introduced into a purifier fed with organic solvent. The aqueous hydrogen peroxide solution obtained according to this known process contains a significant amount of organic impurities. When the nature of these organic impurities is examined, one can see that there are a variety of organic impurities present. The chemical constitution of these organic impurities can be determined, for example, by GC/MS (gas chromatography/mass spectrometry).

It has been found that a large fraction of the organic impurities present in the crude aqueous hydrogen peroxide solution comprises from 7 to 19 carbon atoms and at least one oxygen atom and has a boiling point of from 200° C. to 450° C. These organic impurities render the aqueous hydrogen peroxide solution of little use, in particular for electronic applications. It is thus desirable to provide an aqueous hydrogen peroxide solution which has a reduced content of organic impurities. It is also desirable to obtain the aqueous hydrogen peroxide solution in an economically and technically advantageous manner, for example by consuming a minimum amount of starting materials and fresh reagents.

The process described in U.S. Pat. No. 6,224,845 at least partially overcomes these problems by washing the crude aqueous hydrogen peroxide solution with an organic solvent which has been subjected to a purification treatment prior to the washing. It is suggested to purify the organic solvent by steam stripping. This purification step has, however, the disadvantage that the organic solvent obtained contains water which has to be removed prior to using the organic solvent in the purification of the crude hydrogen peroxide solution. Furthermore, the steam stripping process has the disadvantage that oxygen can be present in the steam which may lead to hazard problems when it comes into contact with hydrogen peroxide.

The present invention is directed towards overcoming this problem by providing an improved and economically advantageous process for purifying the organic solvent.

Consequently, one of the embodiments of the present invention relates to a process for purifying an organic solvent, wherein the process comprises the step of treating the organic solvent by stripping with nitrogen. The present invention further relates to a process for manufacturing a purified aqueous hydrogen peroxide solution, wherein the process comprises the steps of purifying at least one organic solvent by stripping with nitrogen and subjecting a crude aqueous hydrogen peroxide solution to a washing operation with the organic solvent obtained by the stripping step.

It has been surprisingly found that by stripping the organic solvent with nitrogen the above problems occurring by purifying the organic solvent by steam stripping are overcome but nevertheless the organic solvent is purified to an extent which makes it suitable for use in the washing of crude aqueous hydrogen peroxide solution. The washing operation removes most of the organic impurities usually found in the crude aqueous hydrogen peroxide solution so that a purified aqueous hydrogen peroxide solution is obtained.

The term "washing operation" is intended to denote any treatment, which is well known in the chemical industry, of a crude aqueous hydrogen peroxide solution with an organic solvent which is intended to reduce the content of impurities in the aqueous hydrogen peroxide solution. This washing can consist, for example, in extracting impurities present in the crude aqueous hydrogen peroxide solution by means of an organic solvent in apparatuses such as centrifugal extractors or liquid/liquid extraction columns, for example, operating counter-current wise. Liquid/liquid extraction columns are preferred.

The expression "crude aqueous hydrogen peroxide solution" is intended to denote the solutions obtained directly from a hydrogen peroxide synthesis step or from a hydrogen peroxide extraction step or from a storage unit. The crude aqueous hydrogen peroxide solution can have undergone one or more treatments to separate out impurities prior to the washing operation according to the process of the invention.

It is preferred to bring the organic solvent in counter-current relative to the crude aqueous hydrogen peroxide solution. The efficacy of the washing operation depends on the flow rate of the organic solvent. The efficacy of the washing operation is improved when the flow rate of the organic solvent is increased. The volume of the organic solvent used for the washing operation is defined as the quotient of the flow rate of the organic solvent and of the flow rate of the crude aqueous hydrogen peroxide solution.

Thus, the present invention relates to a process for purifying an organic solvent, wherein the process comprises the step of treating the organic solvent by stripping with nitrogen. The technique of stripping is generally known, for example, in "Handbook of separation techniques for chemical engineers", McGraw-Hill, 1996, part 1, pp. 249-274. Preferably, the nitrogen employed for the stripping has a temperature of from 50 C to 180 C, more preferred of from 70 C to 160 C and particularly preferred of from 90 C to 140 C.

The process of the present invention is preferably carried out at atmospheric pressure. However, the process of the present invention can also be carried out at a pressure which is higher or lower than atmospheric pressure, for instance at a pressure of from 0.2 bar abs to 2.0 bar abs.

In the text of the present application the term "nitrogen" refers to a gas containing at least 90 vol.-%, preferably at least 95 vol.-%, more preferred at least 98 vol.-%, yet even more preferred at least 99 vol.-% and particularly preferred at least 99.5 vol.-% of molecular nitrogen. The nitrogen preferably is substantially free of oxygen, more preferably free of oxygen.

In the process according to the invention, polar organic solvents, nonpolar organic solvents and mixtures thereof can be used as the organic solvent. It is, however, preferred to use a mixture of a polar organic solvent and of a nonpolar organic solvent. The polar organic solvents ensure good extraction of the impurities. The nonpolar organic solvents ensure good phase separation since they are immiscible with water. The weight ratio between the nonpolar organic solvent and the polar organic solvent in this mixture is preferably less than or equal to 8. In a particularly preferred manner, this ratio is less than or equal to 4.

Nonpolar organic solvents which can be used are, for example, aliphatic and/or aromatic hydrocarbons or a mixture thereof. These hydrocarbons are, for example, toluene, xylenes or aromatic hydrocarbons comprising from 1 to 5 alkyl substituents. Generally, the alkyl substituents contain from 1 to 5 carbon atoms. Haloaliphatic and/or haloaromatic hydrocarbons such as methylene chloride can optionally be used.

Polar organic solvents which can be chosen are, for example, alcohols or a mixture of alcohols as well as amides, carboxylic or phosphoric acid esters, alkylphosphates or a mixture of at least two of these solvents. Linear or branched secondary aliphatic alcohols give good results and are therefore preferred. The particularly preferred polar organic solvent is 2,6-dimethyl-4-heptanol.

In the case of a mixture of a nonpolar organic solvent and of a polar organic solvent, the purification by stripping with nitrogen has the advantage that it leads to a polarity which favours the removal of the impurities.

The present invention relates to a process for manufacturing a purified aqueous hydrogen peroxide solution, wherein the process comprises the following steps:
i) purifying the organic solvent by stripping with nitrogen as described above;
ii) subjecting a crude aqueous hydrogen peroxide solution to a washing operation with the organic solvent obtained in step i), whereby a purified aqueous hydrogen peroxide solution is obtained.

According to one of the preferred embodiments of the present invention, the volume of the organic solvent used in the washing operation is generally at least 3 l per $m^3$ of crude aqueous hydrogen peroxide solution. Preferably, the volume is at least 25 l per $m^3$ of crude aqueous hydrogen peroxide solution. The volume is generally not more than 100 l per $m^3$ of crude aqueous hydrogen peroxide solution. The volume is preferably not more than 75 l per $m^3$ of crude aqueous hydrogen peroxide solution. The washing temperature is generally at least 10 C. It is preferred to work at a temperature of at least 20 C. Generally, the temperature is not more than 60 C, preferably not more than 40 C. The time required for the washing operation depends on the size of the apparatus chosen and on the flow rate of crude aqueous hydrogen peroxide solution introduced into the apparatus.

In the process according to the invention, the crude aqueous hydrogen peroxide solution can be obtained according to any method known to those skilled in the art. Methods for the manufacture of hydrogen peroxide are, for instance, disclosed in standard text books, such as Kirk-Othmer, "Encyclopedia of Chemical Technology", August 2001, Chapter "Hydrogen Peroxide" or "Ullmann's Encyclopedia of Industrial Chemistry", fifth edition, 1989, Volume A 13, pages 449-454.

Preferably, the crude hydrogen peroxide solution is obtained according to the auto oxidation process, in particular the alkylanthraquinone process. The expression "alkylanthraquinone process" is intended to denote a process for producing an aqueous hydrogen peroxide solution which consists in subjecting a working solution of at least one alkylanthraquinone and/or of at least one tetrahydroalkylanthraquinone to a hydrogenation step, in a diluent, to produce one or more alkylanthrahydroquinones and/or alkyltetrahydroanthrahydroquinones. Diluents which may be used are the liquids which can be used as the organic solvent, described above. The working solution leaving the hydrogenation step is then subjected to an oxidation by means of oxygen, air or oxygen-enriched air to give hydrogen peroxide and to reform the alkylanthraquinones and/or alkyltetrahydroanthraquinones. The hydrogen peroxide formed is then separated from the working solution by means of an extraction step, for example using water, the hydrogen peroxide being recovered in the form of a crude aqueous hydrogen peroxide solution. The working solution leaving the extraction step is then recycled into the hydrogenation step in order to recommence the hydrogen peroxide production cycle.

The term "alkylanthraquinones" is intended to denote 9,10-anthraquinones substituted in position 1, 2 or 3 with at least one alkyl side chain of linear or branched aliphatic type comprising at least one carbon atom. Usually, these alkyl chains comprise less than 9 carbon atoms and, preferably, less than 6 carbon atoms. Examples of such alkylanthraquinones are 2-ethylanthraquinone, 2-isopropylanthraquinone, 2-sec- and 2-tert-butylanthraquinone, 1,3-, 2,3-, 1,4- and 2,7-dimethylathraquinone, 2-sec- and 2-tert-amylanthraquinone and mixtures of these quinones.

The term "alkylanthrahydroquinones" is intended to denote the 9,10-hydroquinones corresponding to the 9,10-alkylanthraquinones specified above.

According to one embodiment of the process of the present invention, the aqueous hydrogen peroxide solution obtained from the washing operation is subjected to at least one subsequent purification step. This step serves particularly to remove or to reduce the content of the organic solvent entrained from the washing operation. The subsequent purification step can consist of any method which is well known to those skilled in the art for reducing the impurity content of an aqueous hydrogen peroxide solution. A distillation step is particularly suitable as a subsequent purification step. This variant of the process according to the invention gives aqueous hydrogen peroxide solutions with a TOC (total organocarbon concentration), defined according to ISO standard 8245, of less than or equal to 150 mg/l, preferably less than or equal to 100 mg/l. TOC values of less than or equal to 12 mg/l can be even reached.

In one specific embodiment of the process according to the invention, the organic solvent is a part of the working solution used in the alkylanthraquinone process. This embodiment makes it possible to modify the feed flow rate of the organic solvent in the operation for washing the crude aqueous hydrogen peroxide solution obtained according to the alkylanthraquinone process (washing operation). It is in fact desirable to provide a flow rate of the organic solvent which is sufficient to feed the operation for washing an aqueous hydrogen peroxide solution. It is particularly desirable to be able to adjust the flow rate of the organic solvent as a function of the desired washing efficacy and as a function of the amount of the crude aqueous hydrogen peroxide solution to be subjected to the washing operation.

In the alkylanthraquinone process, the working solution is available in an amount which is large enough to make it possible to take an amount of the organic solvent which is required to reach the desired feed flow rate of the organic solvent.

The process according to the present invention has economic and technical advantages since it avoids the use of large amounts of fresh organic solvents to feed the washing operation. Fresh organic solvents are more expensive than purified organic solvents. A large scale production of hydrogen peroxide employing fresh organic solvents for the washing operation would require a continuous feed of fresh organic solvent and their destruction after the washing operation. Consequently, such large scale production would be rather cost intensive.

Before the additional subsequent purification step the present invention for example provides an aqueous hydrogen peroxide solution with a reduced content of organic impurities, i.e. an aqueous hydrogen peroxide solution with a TOC, defined according to ISO standard 8245, of less than or equal to 150 mg/l. Preferably, the TOC is less than or equal to 100 mg/l.

Specific aqueous hydrogen peroxide solutions provided by the process of the present invention contain less than 100 mg/l of organic impurities comprising from 7 to 19 carbon atoms and at least one oxygen atom, and have a boiling point of 200° C. to 450° C. Preferably, the solution contains less than 75 mg/l of organic impurities comprising from 7 to 19 carbon atoms and at least one oxygen atom and having a boiling point of 200° C. to 450° C.

The organic impurities content of the aqueous hydrogen peroxide solutions, expressed in mg/l, is derived, on one hand, from the determination of the TOC, defined according to ISO standard 8245 and, on the other hand, from the GC/MS analysis of the contributions of various organic impurities to the TOC.

The aqueous hydrogen peroxide solutions provided by the process of the present invention generally have a hydrogen peroxide concentration of at least 10% by weight and usually of at least 30% by weight. Similarly, these solutions generally contain not more than 80% by weight of hydrogen peroxide and usually not more than 75% by weight.

Yet another aspect of the present invention relates to a plant for producing hydrogen peroxide by the auto oxidation process, this plant comprising:
a) a unit for hydrogenating an organic working solution containing dissolved alkylanthraquinones;
b) a unit for oxidizing hydroquinones produced in the unit for hydrogenating c) a unit for extracting the hydrogen peroxide from the organic working solution, whereby crude aqueous hydrogen peroxide solution is obtained;
d) a unit for washing the crude aqueous hydrogen peroxide solution obtained from the unit for extracting c) with an organic solvent; and
e) a unit for solvent purification, in which the organic solvent is being purified by the process comprising a step of treating the organic solvent by stripping with nitrogen; hence, said unit comprises a nitrogen stripping column i.e. a stripping column equipped with nitrogen supply means. These means may for instance include a pump and/or a heater.

A plant as described above and being useful for carrying out the process of the present invention is described in detail (but except for the nitrogen supply means) for example in U.S. Pat. No. 6,224,845, the content of which is incorporated herein by reference. This plant comprises a unit for purification of the solvent which is then used for purifying the crude hydrogen peroxide solution.

Should the disclosure of any patents, patent applications, and publications which are incorporated herein by reference conflict with the description of the present application to the extent that it may render a term unclear, the present description shall take precedence.

Figure 2:
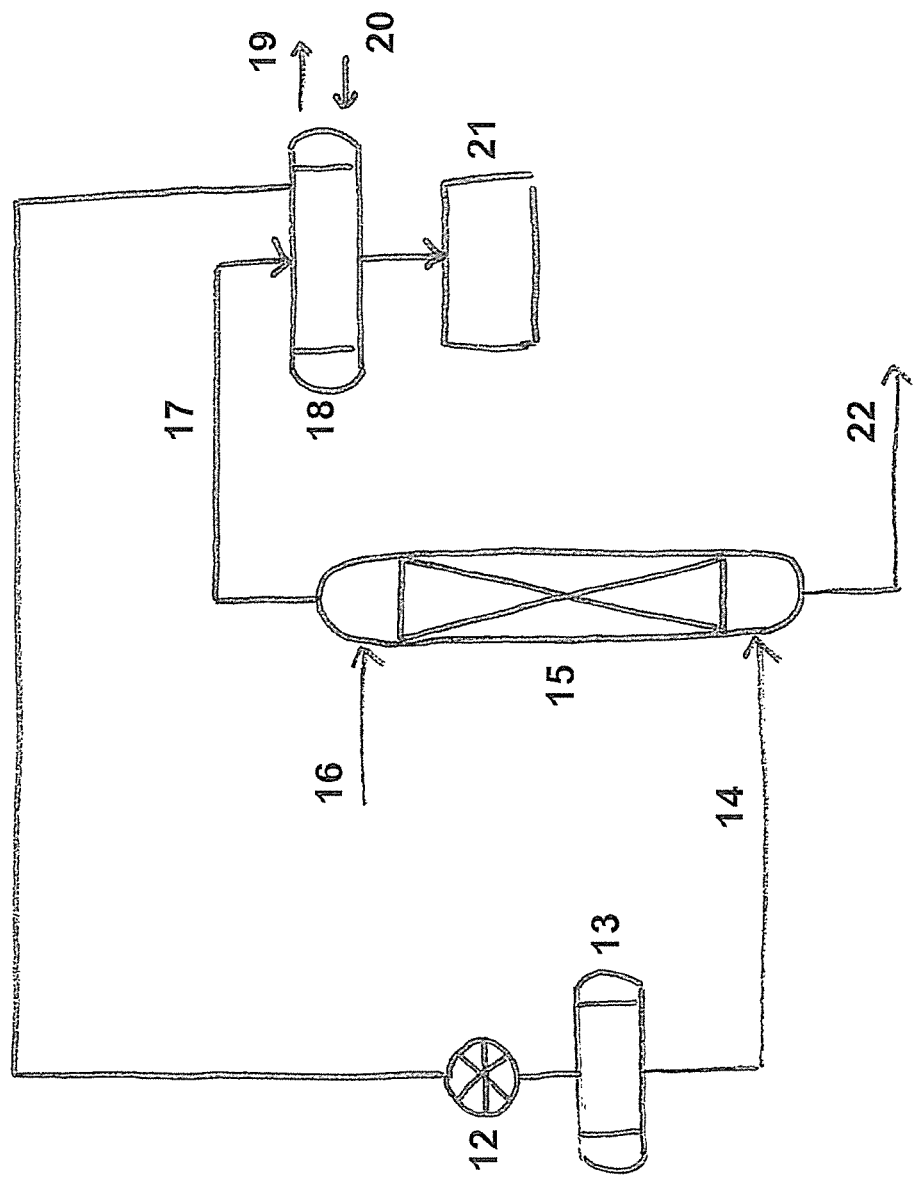
Figure 3:
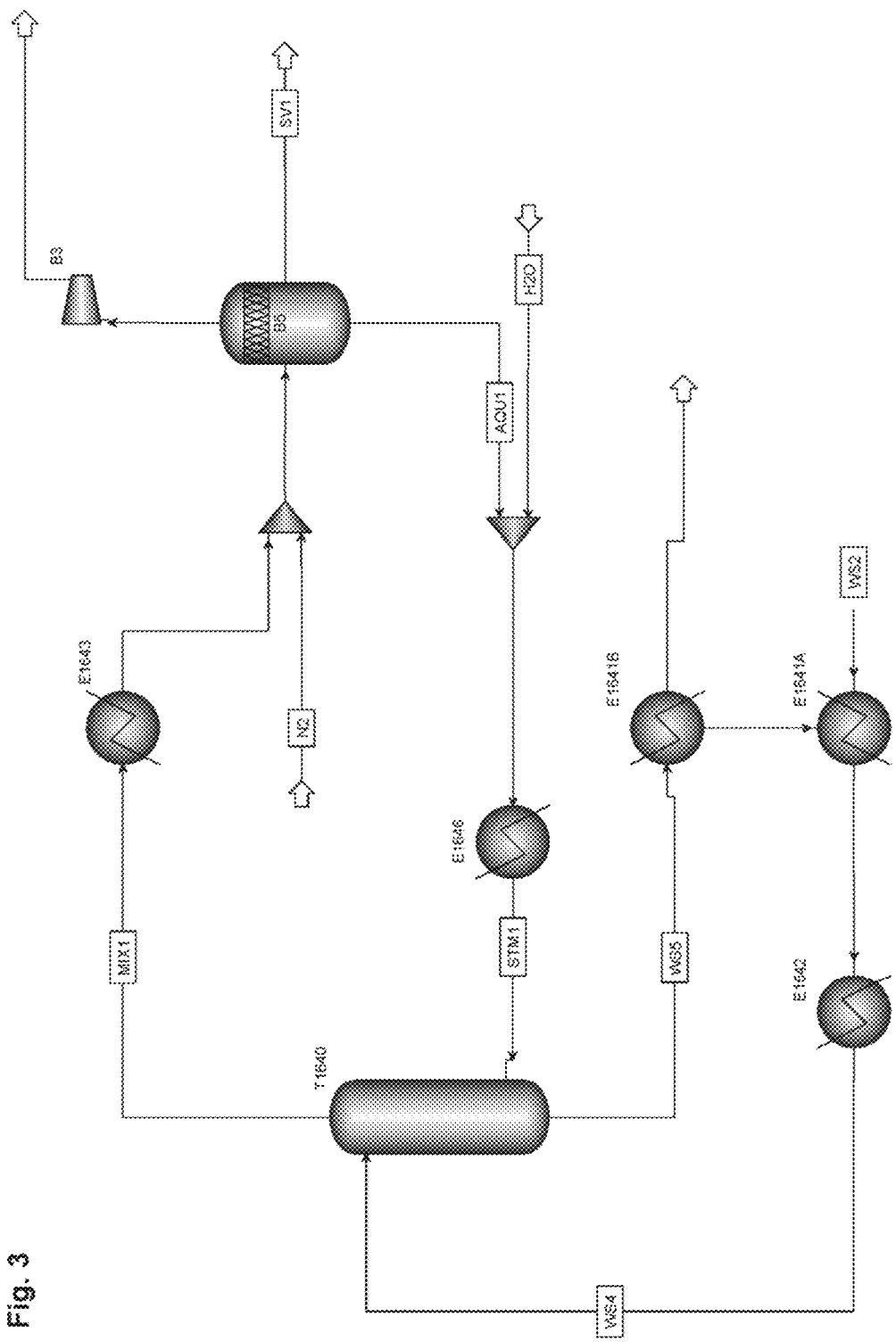
Figure 4:
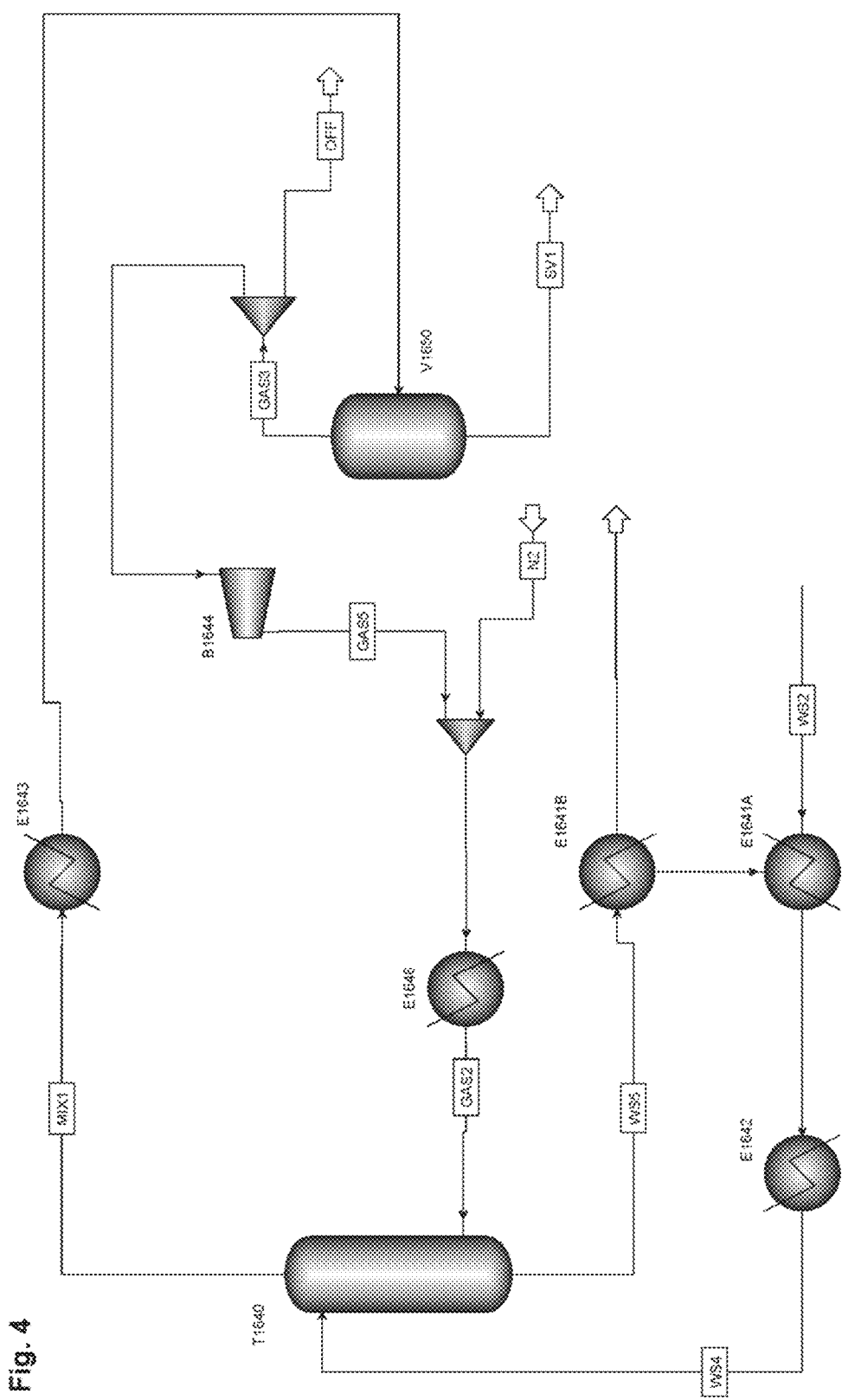

The invention is illustrated in a non limitative way by FIGS. 1 to 4 attached. FIGS. 1 and 2 are schematic illustrations of a process according to prior art (with steam stripping) and according to the invention (nitrogen stripping) and FIG. 3 and FIG. 4 are ASPEN simulations of the process according to FIG. 1 and FIG. 2 respectively.

For the purpose of comparison, the unit for solvent purification known in the prior art is shown in FIG. 1. This unit for solvent purification employs steam stripping rather than nitrogen stripping, whereby the stripping process takes place on the stripping column 1. In this purification unit the crude organic solvent 3 enters the stripping column 1 in its upper part and exits it in its lower part as stream 4. Steam 2 enters the stripping column 1 in its lower part and the steam containing solvent 5 exits the stripping column in its upper part. The steam containing solvent 5 is cooled to the desired temperature in the condenser 6 whereby circulating cooling water 7, 8 is used for the purpose of cooling. In the condenser 6 the condensation of the steam containing solvent 5 takes place whereby the resulting condensate is transferred to the decantation unit 9 where the solvent 10 and the aqueous effluent 11 are separated from each other. The aqueous effluent 11 can be used for the production of steam 2 and the solvent 10 can be used for washing crude aqueous hydrogen peroxide solution. However, the production of steam 2 from the aqueous effluent 11 is energy-consuming. Alternatively, the aqueous effluent 11 is treated as a waste.

A unit for solvent purification according to the present invention is shown in FIG. 2. A stream of nitrogen 14 is circulated by pump 12 and is brought to the desired temperature by heater 13. The process for purifying the crude organic solvent 16 is carried out on the stripping column 15. The stripping column 15 is operated counter-current wise. Thus, the crude organic solvent 16 enters the top part of the stripping column 15 and exits the stripping column 15 in its lower part as stream 22. Accordingly, nitrogen stream 14 enters the stripping column 15 in its lower part and the nitrogen-containing solvent 17 exits the stripping column 15 in its upper part.

The stream of nitrogen-containing solvent 17 is cooled by the condenser 18 to a temperature of from 2° C. to 50° C., preferably of from 5° C. to 15° C. Preferably, the condenser 18 is cooled to the desired temperature by the circulating stream of cooling water 19 and 20. Thus, a substantial condensation of the solvent from the nitrogen stream containing solvent 17 takes place and the purified solvent 21 can be collected and used for example for the purification of crude aqueous hydrogen peroxide solution.

Thus, the unit for solvent purification, in which the process comprising a step of treating of the organic solvent by stripping with nitrogen takes place, provides a number of advantages over the process comprising a step of treating of the organic solvent by steam stripping. The preparation of the solvent is simpler because a decantation, to separate the solvent from water is not necessary. Furthermore, the preparation of the solvent does not generate any aqueous effluent. A further advantage of the process of the present invention is that less energy is required for heating the nitrogen to the required temperature compared to the production of steam required in the prior art process.

When the solvent purification process is carried out in the unit shown in FIG. 1, there is a safety problem, because oxygen can be present in the steam and cause fire or explosion of the organic solvent vapour or during the subsequent contacting with hydrogen peroxide. Contrary thereto, the process of the present invention employs nitrogen and therefore can be carried out in a safer way.

As explained above, FIG. 3 and FIG. 4 attached are ASPEN simulations of a process according to FIG. 1 and FIG. 2 respectively.

FIG. 3 shows more precisely:
a flow of 35850 kg/h of working solution (WS2) being heated up first by a cross heat exchanger (E1641A and B) and then, by a specific heater (E1642) to generate incoming stream WS4 (corresponding to stream 3 of FIG. 1) which is at 140° C. and which enters column T1640 (stripping column 1 of FIG. 1)

in column T1640, this stream WS4 is tripped with steam (STM1 which corresponds to stream 2 of FIG. 1) which has been generated by heating through heater E1646, a mixture of fresh water and of an aqueous effluent AQU1 at the bottom of column T1640, a stream of washed solvent exits (WS5 corresponding to stream 4 of FIG. 1) which is hot (126° C.) and hence, is used in the above mentioned cross heat exchanger E1641 at the top of column T1640, a stream of vapor containing solvent (MIX1 corresponding to stream 5 of FIG. 1) is condensed in cooler E1643 (6 in FIG. 1); nitrogen is added in order to lower the flame and explosion hazards related to the oxygen present in the vapor phase; the whole ends up in a decanter B5 (9 of FIG. 1), which is put under vacuum by pump B3 to vent it and from which aqueous effluent AQU1 (corresponding to stream 11 on FIG. 1) exits at the bottom after having been separated from a solvent phase (SV1, 10 on FIG. 1).

FIG. 4 shows more precisely:

a flow of 35850 kg/h of working solution (WS2) being heated up first by a cross heat exchanger (E1641A and B) and then, by a specific heater (E1642) to generate incoming stream WS4 (corresponding to stream 16 of FIG. 2) which is at 140° C. and which enters column T1640 (which corresponds to column 15 of FIG. 2)

in column T1640, this stream WS4 is tripped with hot nitrogen (GAS2 which corresponds to stream 14 of FIG. 2) which has been generated by heating through heater E1646 (13 on FIG. 2), a mixture of fresh nitrogen and of recycled nitrogen (GAS5)

at the bottom of column T1640, a stream of washed solvent exits (WS5 corresponding to stream 22 of FIG. 2) which is hot (124° C.) and hence, is used in the above mentioned cross heat exchanger E1641 at the top of column T1640, a stream of nitrogen containing solvent (MIX1 corresponding to stream 17 of FIG. 2) is condensed in cooler E1643 (18 in FIG. 2) and sent to a separation tank V1650 where the solvent falls down at the bottom as stream SV1 (21 of FIG. 2) and where the gas stream GAS3 exiting at the top is compressed by compressor B1644 to generate recycled nitrogen stream GAS5, and non condensed gases (comprising oxygen and nitrogen) are vented (as OFF stream)

Table 1 below summarizes the results of the simulations and more precisely, shows that the heating and cooling duties required by the hot nitrogen stripping (the invention) are less than those required for the steam stripping (prior art).

TABLE 1

|  |  | New patent Hot nitrogen | Prior art Steam stripping |
|---|---|---|---|
| Flow WS | kg/h | 35850 | 35850 |
| Flow of generated solvents | kg/h | 3359 | 3359 |
| Heat required to heat N2 | kW | 86 | 0 |
| Heat required to produce steam | kW | 0 | 451 |
| Heat required to heat WS | kW | 692 | 643 |
| Cooling needed to condense the solvent | kW | 671 | 970 |
| Energy required to compress N2 | kW | 42 | 0 |
| Energy required to vent O2 | kW | 0 | 6 |
| Total heat required | kW | 778 | 1094 |
| Total cooling required | kW | 671 | 970 |
| Total work required | kW | 42 | 6 |

The invention claimed is:

1. A process for manufacturing a purified aqueous hydrogen peroxide solution, comprising:
    i) purifying at least one organic solvent by treating the at least one organic solvent by stripping with nitrogen;
    ii) subjecting a crude aqueous hydrogen peroxide solution to a washing operation with the at least one organic solvent obtained in step i) to obtain the purified aqueous hydrogen peroxide solution
    wherein the stripping with nitrogen comprises:
        generating a stream of nitrogen that contains at least a portion of the at least one organic solvent;
        condensing the solvent-containing stream of nitrogen to separate the at least one organic solvent from the stream of nitrogen; and
        compressing the stream of nitrogen obtained by the separation with a compressor and recycling it for stripping another portion of the at least one organic solvent.

2. The process according to claim 1, wherein the nitrogen employed for the stripping has a temperature of from 50° C. to 180° C.

3. The process according to claim 1, wherein the organic solvent is a mixture of a nonpolar organic solvent and a polar organic solvent, in a weight ratio of nonpolar organic solvent to polar organic solvent of less than or equal to 8.

4. The process according claim 1, wherein the washing operation in step ii) is carried out with a volume of the organic solvent of from 3 to 100 l per $m^3$ of the crude aqueous hydrogen peroxide solution.

5. The process according to claim 1, wherein the crude aqueous hydrogen peroxide solution is obtained according to an auto oxidation process.

6. The process according to claim 5, wherein the organic solvent is a part of a working solution used in the auto oxidation process.

7. The process according to claim 1, wherein the purified aqueous hydrogen peroxide solution obtained in step ii) is subjected to a subsequent purification step after the washing operation.

8. The process according to claim 7, wherein the subsequent purification step is a distillation.

9. The process according to claim 1, said process using a plant comprising:
    a) a unit for hydrogenating an organic working solution containing dissolved alkylanthraquinones;
    b) a unit for oxidizing hydroquinones produced in the unit for hydrogenating
    c) a unit for extracting the hydrogen peroxide from the organic working solution, whereby crude aqueous hydrogen peroxide solution is obtained;
    d) a unit for washing the crude aqueous hydrogen peroxide solution obtained from the unit for extracting c) with an organic solvent; and
    e) a unit for solvent purification, said unit comprising a nitrogen stripping column.

10. The process according to claim 9, wherein the unit for solvent purification e) receives the organic solvent leaving the unit for washing d).

11. The process according to claim 9, wherein the organic solvent is taken from the organic working solution before being introduced into the unit for solvent purification.

12. The process according to claim 9, wherein the unit for solvent purification comprises a condenser.

13. The process according to claim 12, wherein the condenser is cooled by circulation of cooling water.

14. The process according to claim 9, wherein the unit for solvent purification comprises a pump and a heater.

15. The process according to claim 9, wherein the stripping column is operated counter-current wise.

* * * * *